March 11, 1947. P. ARANT 2,417,341
FUEL PRESSURE CONTROL AND IGNITION CHECK FOR BURNERS
Filed July 26, 1943 2 Sheets-Sheet 2
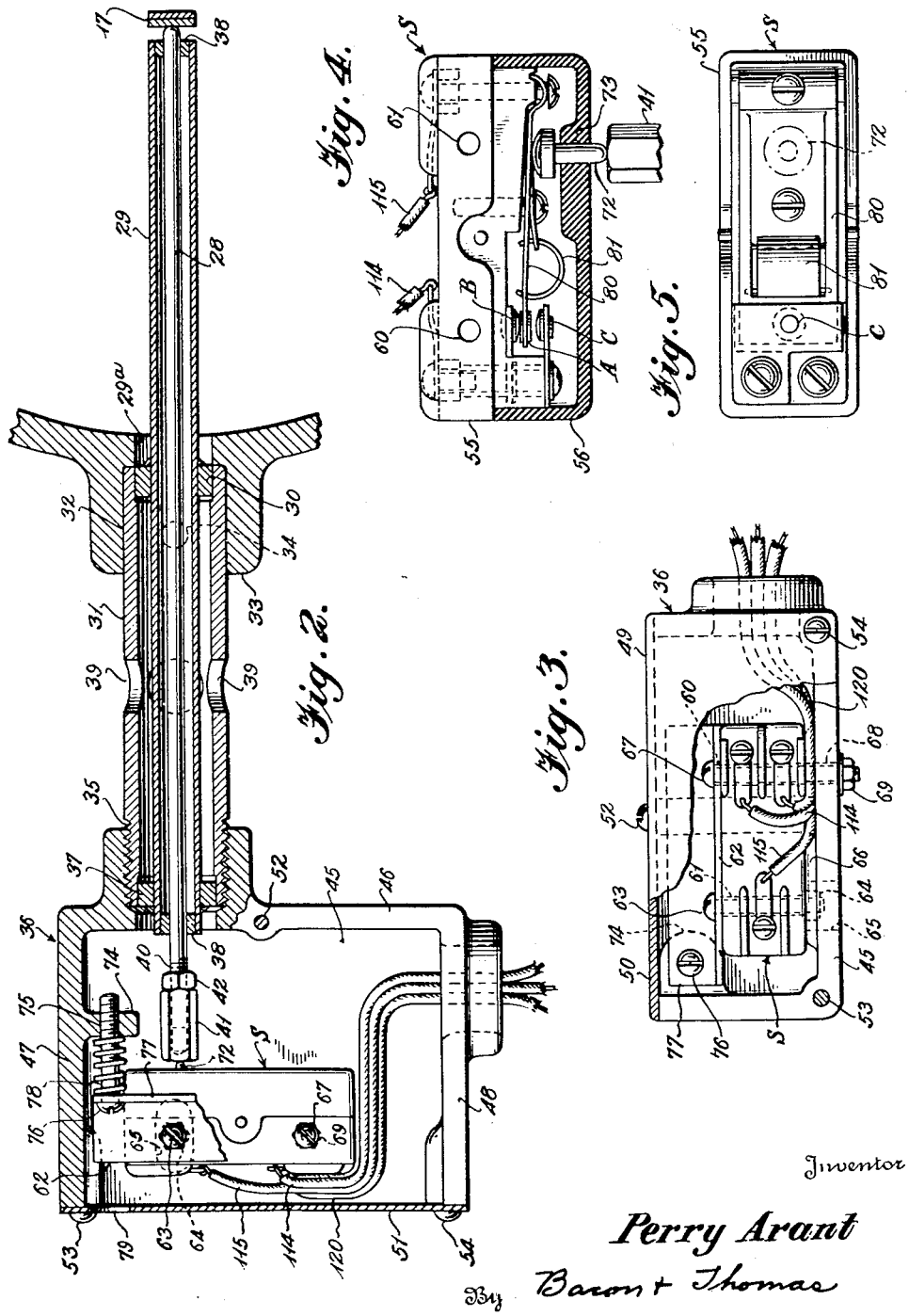
Inventor
Perry Arant
By Baron + Thomas
Attorneys Patented Mar. 11, 1947

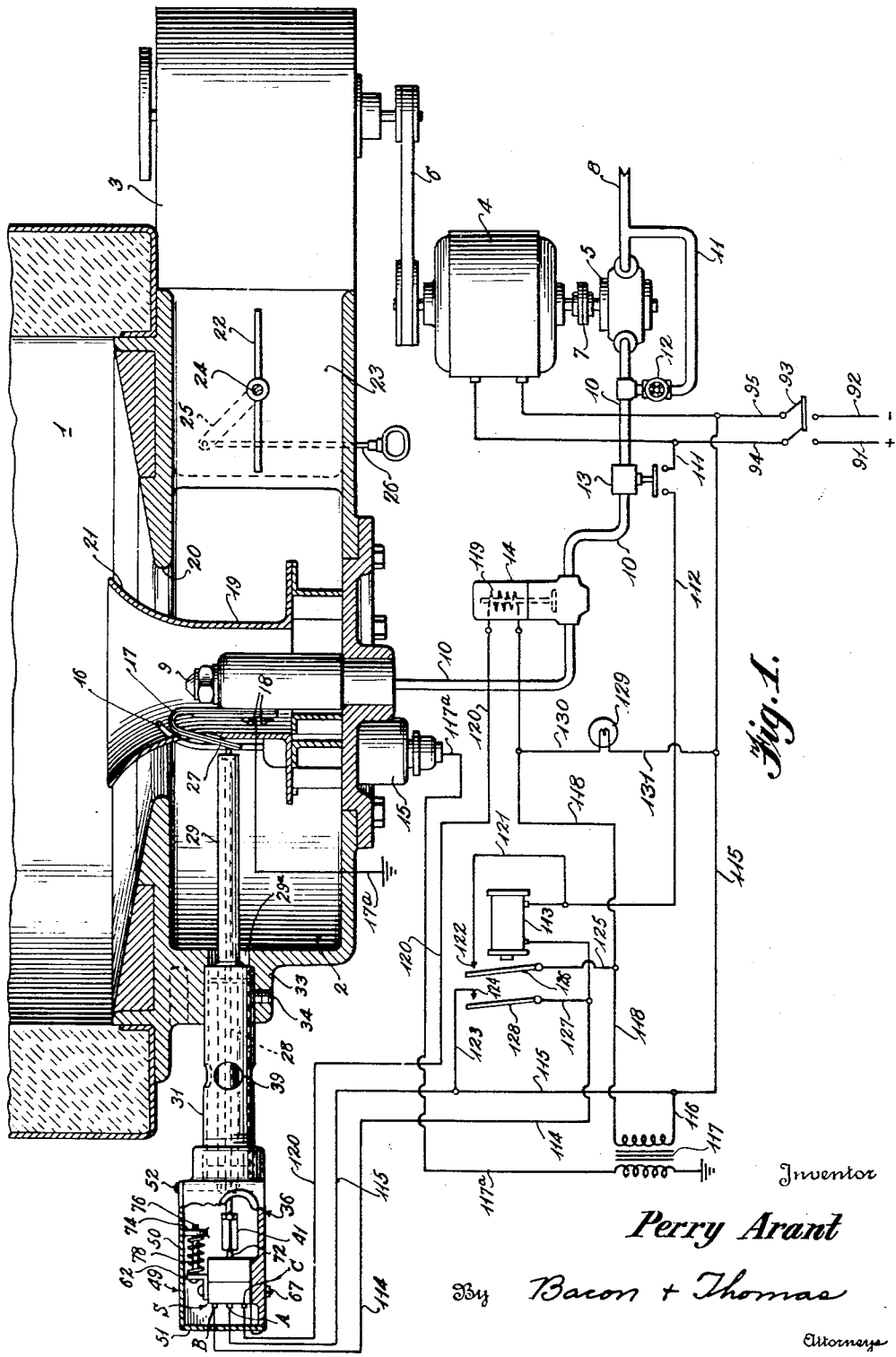

2,417,341

UNITED STATES PATENT OFFICE 2,417,341

FUEL PRESSURE CONTROL AND IGNITION CHECK FOR BURNERS

Perry Arant, Alhambra, Calif., assignor to Clayton Manufacturing Company, Alhambra, Calif.

Application July 26, 1943, Serial No. 496,211

17 Claims. (Cl. 158—28)

This invention relates to control means for atomized fuel burners and more particularly to a safety control system for an electrically ignited furnace which will eliminate all danger of explosion or fire.

Practically all explosions in burners operating with atomized fuel are the direct result of ignition failures, either momentary or complete. Ignition failures may be the direct result of improper setting of the spark gap, carbonizing of one or both of the electrodes, a cracked electrode permitting partial short-circuiting, a wet or moist high tension wire, etc.

Momentary ignition failures are particularly dangerous because they usually occur (in prior devices) after the fuel has been sprayed into the combustion chamber, thereby forming an explosive mixture which is ignited upon recurrence of the spark. In some instances, especially with partial short-circuiting due to moisture, the heat of the spark will dry out the moisture relatively quickly, permitting a delayed spark at the time the combustion chamber is full of vaporized fuel. This necessarily presents a very hazardous condition. The present invention avoids this source of danger by delaying the introduction of fuel into the combustion chamber until the spark has attained an intensity sufficient to ignite the fuel.

Complete spark failure may also be dangerous if it occurs at a time when the walls of the combustion chamber are still hot, or when a piece of glowing carbon remains in the combustion chamber and fuel is supplied to the burner. This source of danger usually presents itself when an attempt is made to start the burner immediately after having been cut off and the spark completely fails, but the combustion chamber is hot enough to cause the fuel to flash. The present invention avoids this danger by causing the apparatus to recycle, delaying the recurrence of the spark until after the combustion chamber has been purged of combustible gases and cooled to below a temperature that would ignite the fuel. Further assurance of safe operation is provided by preventing the occurrence of any ignition spark until a predetermined fuel pressure is attained in the fuel line.

Accordingly, the principal object of the invention is to provide a safety control system for a burner which will positively prevent explosions and eliminate the danger and/or injury which usually results therefrom.

Another object of the invention is to provide a safety control system for burners in which the ignition spark cannot be initiated unless fuel is available for combustion and said fuel is under a predetermined pressure in the fuel line.

Another object of the invention is to provide a safety control system for burners which will prevent fuel from being introduced into the combustion chamber when said chamber is still in a hot condition.

Another object of the invention is to provide a safety burner control system which will scavenge the combustion chamber of combustible gases before fresh fuel can be introduced thereinto.

Still another object of the invention is to provide a safety control system for burners which will prevent fuel from being supplied to the burner except when the ignition spark is of sufficient intensity to ignite the fuel.

A further object of the invention is to provide a safety control system for burners capable of general use with oil or gas furnaces, and particularly adapted for use with furnaces burning highly volatile fuel such as high octane gasoline which produces a particularly hazardous explosive mixture.

A still further object of the invention is to provide either manual or fully automatic control means for a fuel burner which is easy to adjust, relatively simple in construction, and above all, dependable and fool-proof.

Briefly, the invention comprises a safety control system having a pressure-responsive fuel switch arranged to complete a circuit to a relay-controlled ignition transformer, which produces a spark between a pair of electrodes. If the fuel pressure is insufficient to actuate the fuel switch no current reaches the relay and no spark is produced at the electrodes. One of the electrodes is bi-metallic and is responsive to the heat produced by the high voltage spark. This electrode is generally U-shaped and may be made to either expand or contract upon heating, depending upon the action desired. One leg is secured to a rigid support and the other leg is free. In the present construction, the bi-metallic electrode is designed to contract upon heating, that is to say, its legs are brought closer together upon heating. A freely slidable push rod is associated with the free leg of the bimetallic or thermostat-electrode and is arranged to operate a very sensitive, single-pole double-throw, snap-action switch which functions both as an ignition switch means and a fuel control switch means. The switch as a whole is generally referred to hereinafter as a "safety switch." Contraction of the bi-metallic electrode permits the snap-action mechanism of the safety switch to move the pole or movable contact out of engagement with one stationary contact into engagement with another stationary contact of said safety switch. Normally, when the bi-metallic electrode is in its cold condition, the movable contact of the safety switch is engaged with a stationary ignition contact arranged so that under certain conditions a circuit is completed to the relay and ignition transformer. As the bi-metallic element contracts due to heating by the spark and consequent thermal expansion, the push rod will permit the movable contact of the safety switch to be snapped over into engagement with the other stationary or fuel contact and complete a circuit to a solenoid-operated fuel control valve.

The safety switch is associated with a double pole relay and the ignition transformer is so connected in the circuit that upon closing of a main switch, either manually or automatically, a motor starts to drive a blower and a fuel pump and if sufficient pressure is built up in the fuel line the fuel switch aforementioned will complete the circuit to the relay and ignition transformer and sparking will commence. This spark will heat the bi-metallic electrode and if the spark is of sufficient intensity to ignite the fuel said electrode will contract, permitting the safety switch to snap over and complete the circuit to the solenoid fuel valve through the fuel contact and allow fuel to proceed to the burner nozzle. A novel holding circuit supplies current to the transformer so that the spark is uninterrupted even though the movable contact of the safety switch has snapped out of engagement with the ignition contact and engaged the fuel contact.

One of the important safety features of the invention is provided by the pressure-responsive fuel switch, which is actuated by the pressure of the fuel to be supplied to the burner. The fuel pressure switch is such that it will complete the circuit to the ignition transformer only when a pressure of about 50 to 70 pounds per sq. in. is attained in the fuel line, or in any event when a pressure sufficient to atomize the fuel is attained in said fuel line. Obviously, if the fuel tank is empty, or if an insufficient volume of fuel is supplied to the fuel line, it will be impossible to maintain the necessary line pressure to actuate the fuel pressure switch, so that the circuit to the relay and ignition transformer will not be completed under such circumstances and no spark will be produced.

Assuming, that ample fuel is available and that the fuel pressure switch has been actuated and the circuit to the ignition transformer has been completed, if the spark gap, for any reason, fails to produce the heat required to contract the thermostat-electrode to the extent necessary to allow the movable contact to snap over into engagement with the fuel contact, no fuel whatever will be supplied to the burner nozzle because the fuel solenoid-operated valve will remain closed. Hence, there is eliminated not only the danger of explosion but the fire hazard which would result from the introduction of fuel into the combustion chamber without ignition by the spark.

Another important safety feature of the invention is that, once the circuit to the relay associated with the ignition coil has been broken, as by fuel pressure failure or opening of the main switch, no spark can again be produced until the fuel pressure switch has been actuated and the thermostat-electrode has had an opportunity to cool and expand and thereby allow the movable contact of the safety switch to engage the ignition contact of said switch and complete the circuit to the relay and ignition coil. Cooling of the thermostat-electrode is accomplished by the use of a dual purpose blower, which blows air into an air inlet chamber below the combustion chamber and also cools the bi-metallic electrode. This air purges the furnace of any combustible or explosive vapors and simultaneously effects the cooling of the thermostat-electrode which is a prerequisite to the initiation of an ignition spark and the subsequent supply of fuel to effect a restart.

In practice, in a given steam generating unit, the firebox or combustion chamber can be cooled down in less than 15 seconds from a red hot condition to a relatively cool condition such that the thermostat electrode will be substantially completely expanded to a condition comparable to that which it is in at a cold start. Once the thermostat-electrode has been cooled to close the ignition switch means, or in instances where the furnace is started from a cold condition, only about six seconds' time is required for the spark to heat and contract the thermostat-electrode sufficiently to actuate the fuel switch means to open the solenoid-controlled fuel valve. This six seconds delay, even in the case of a start with a cold electrode, provides ample time for the blower to scavenge the firebox or combustion chamber of any combustible gases that may remain therein, before any spark is initiated.

If difficulty is encountered in cold weather, in heating the bi-metallic electrode to the extent necessary to effect opening of the fuel valve, an air choke may be manually operated to prevent the cold air introduced by the blower from excessively cooling the electrodes while said electrodes are being heated by the spark. However, as soon as the fuel valve has opened and the fuel has been ignited, the air choke is released so that the blower will supply the necessary air for complete combustion of the fuel. In the normal use of the apparatus, that is to say, after the apparatus has been started and the burner is repeatedly going on and off at short intervals of less than about 15 minutes, it is usually unnecessary to use the air choke since the bi-metallic electrode will be maintained in a slightly heated condition by the radiant heat of the firebox and the furnace will start automatically when necessary without the manual actuation of the air choke.

Other objects and features of the invention will be apparent from the following description taken in connection with the accompanying drawings in which:

Fig. 1 is a diagrammatic view, partly in section, of a burner and safety control system embodying the principles of the present invention;

Fig. 2 is an enlarged sectional view taken on the line 2—2 of Fig. 1 particularly illustrating the manner in which the safety switch can be minutely adjusted to vary the timing of the ignition and the actuation of the solenoid fuel valve;

Fig. 3 is an enlarged elevational view, partly in section, of the housing and safety switch shown in Fig. 2;

Fig. 4 is a view, partly in section, of the safety switch; and

Fig. 5 is a view of the safety switch with the cover section removed.

Referring to Fig. 1 of the drawings, the numeral 1 generally indicates the combustion chamber of a furnace which may be associated with a heating coil (not shown) of a steam generating apparatus. Below the combustion chamber is an air-intake chamber 2 which may be plain, but is preferably of the volute or spiral flow type disclosed in a patent granted to Walter B. Kerrick, No. 2,284,906. A blower 3 is arranged to deliver air to the air-intake chamber 2. The blower 3 is driven by an electric motor 4 arranged to simultaneously drive a fuel pump 5. A belt 6 transmits a drive from the motor 4 to the blower 3 and the fuel pump 5 is connected with the shaft of the motor 4 by a suitable coupling 7. The fuel to be utilized is supplied to the pump 5 through a conduit 8, and the pump 5 is arranged to deliver fuel to a burner nozzle 9 through a fuel line 10. A by-pass conduit 11 interconnects the supply conduit 8 and the delivery line 10. A valve 12 is connected in the by-pass conduit 11 and this valve may be either manually regulated to control the supply of fuel to the burner nozzle 9 by varying the volume of fuel that can be by-passed back to the pump through the conduit 11, or the valve 12 may be such as to be automatically operated in accordance with the heat demand to maintain a given temperature or steam pressure of the liquid being heated. A fuel-pressure-responsive switch 13 is connected in the fuel line 10 beyond the point of connection of the by-pass conduit 11 therewith, and a solenoid-operated fuel valve 14 is connected in the line 10 between the fuel pressure switch 13 and the burner nozzle 9.

In the event that the present control system is used with a gas burner, that is to say, a burner which does not use atomized liquid fuel, it will be apparent that the fuel pump 5 may be omitted.

A spark plug 15 projects into the air intake chamber 2 and is provided with a single electrode 16. The electrode 16 has the end thereof disposed in predetermined spaced relation to an inverted generally U-shaped bi-metallic electrode 17 conveniently mounted upon the base of the burner nozzle 9 by screws 18. The electrodes 16 and 17 are partially sheltered from the incoming air supplied by the blower 3 by a shield 19 through which they extend. The upper end of shield 19 projects into the combustion chamber 1 through an opening 20 and flares outwardly into the combustion chamber in conical fashion as indicated at 21, whereby to effect a more desirable deflection of the air passing through the opening 20 into the combustion chamber 1.

The volume of air supplied to the air-intake chamber 2 may be varied when necessary by manually adjusting a baffle 22 arranged in an entrance passageway 23 leading from the blower 3 to said air-intake chamber 2. The baffle 22 is mounted upon a shaft 24 carrying an arm 25 at one end thereof. A manually operable rod 26 is connected with the free end of the arm 25, the arrangement being such that when the rod 26 is pulled by the operator the baffle 22 will assume a position obstructing the flow of air to the air-intake chamber 2. The principal use of the baffle 22, as explained hereinbefore, is to manually cut off the air supply so that heating of the electrodes 16 and 17 by the electric spark will be facilitated.

The U-shaped bi-metallic electrode 17 has one leg thereof fixedly secured to the burner nozzle support by the screws 18, previously referred to. The other leg 27 of the bi-metallic electrode 17 is free to move in accordance with the expansion and contraction of said electrode. In the present system, the bi-metallic electrode 17 is employed to actuate the safety switch generally indicated by the letter S. To this end, the leg 27 is engaged by a rod 28, which is substantially completely enclosed in a hollow tube 29 so that it is shielded against undesirable thermal expansion due to any temperature changes in the air-inlet chamber 2. The tube 29 extends through an opening 29ª in the wall defining the air intake chamber 2 and is supported at a point substantially medially of its length by a bushing 30 which is welded thereto and received within a casing 31. One end 32 of the casing 31 is received in a boss 33 formed concentric with the opening 29ª. A set screw 34 holds the casing 31 in position in the boss 33. The other end of the casing 31 is threaded as indicated at 35 and carries a junction box 36 containing the safety switch S. The threaded end 35 also contains a bushing 37 welded to the tube 29 adjacent the outer end thereof. The tube 29 contains bushings 38 at each end thereof which serve as guides permitting free sliding movement of the rod 28. The casing 31 is provided with a plurality of openings 39 which serve to vent the space surrounding the tube 29.

The rod 28 projects into the junction box 36 as shown in Fig. 2 and is provided with threads 40 which receive an adjustable abutment 41 and a jam nut 42. The adjustable abutment 41 is provided for making an approximate adjustment relative to the safety switch S, but a more accurate and finer timing adjustment of said safety switch can be made by the construction which will be described herebelow.

The junction box 36 includes a bottom wall 45, a side wall 46 and two end walls 47 and 48. The junction box 36 is closed by an angle-shaped cover 49 including a top wall 50 and a side wall 51. The top wall 50 is secured to the face of the side wall 46 by a screw 52 and the side wall 51 of the cover is secured to the face of the end walls 47 and 48 by screws 53 and 54, respectively.

The safety switch S includes a body portion 55 and a removable cover portion 56. The body portion 55 is provided with spaced holes 60 and 61 (see Fig. 4). A piece of angle iron 62 (Figs. 1 to 3) is secured to the body 55 by a bolt 63 extending through the hole 61 and a nut 64 mounted upon the lower end of said bolt. The bottom wall 45 of the junction box 36 is provided with an elongated opening 65 to receive the nut 64 and to permit movement of said nut in said opening for a purpose to be described later. The switch S rests upon a pad 66 formed upon the bottom wall 45 of the junction box 36 and a bolt 67 extending through the angle iron 62 and the hole 60 in the body 55 mounts said switch for pivotal movement relative to said junction box. The bolt 67 extends through an opening 68 in the bottom wall 45 and a nut 69 is mounted upon the lower end of said bolt.

The safety switch S per se does not constitute a part of the present invention and is allegedly manufactured by the Acro Electric Company, of Cleveland, Ohio, under Patent 2,237,705. Hence, it is believed to be unnecessary to describe the same in any great detail. However, for the purposes of the present disclosure it is pointed out that the safety switch S includes an actuating pin 72 (Fig. 4) extending through an opening 73 in the switch cover section 56. The projecting extremity of the pin 72 is rounded and engages the end surface of the abutment 41 carried by the freely slidable rod 28. The end wall 47 of the junction box 36 is provided with an inwardly extending lug 74 (Fig. 2) having a threaded opening 75 to receive an adjusting screw 76. The angle iron 62 includes an upright flange 77 through which the adjusting screw projects. A spring 78 is interposed between the flange 77 and the lug 74 and urges the flange in a direction away from said lug. The cover 49 has an aperture 79 through which a screw driver can be inserted to adjust the screw 76. Thus, it will be apparent that by turning the adjusting screw 76 the safety switch S will pivot as a whole about the bolt 67 and in this manner the actuating pin 72 can be very closely and minutely adjusted with respect to the end of the abutment 41.

The switch S is of the single-pole double-throw type and comprises a movable contact A carried by a flexible arm 80 having a snap-action element 81 associated therewith. The switch S also includes two stationary contacts B and C which are adapted to be alternately engaged by the movable contact A. The contact B may be termed the "ignition contact" and the contact C the "fuel contact" inasmuch as these contacts, when engaged by the contact A, aid in completing the circuit to the ignition coil or transformer (described later) and the solenoid fuel valve 14, respectively. Thus, the safety switch S may be appropriately said to include both an ignition switch means and a fuel control switch means.

The circuit for the safety burner is illustrated in Fig. 1 and includes main lines 91 and 92 which supply electrical current to the apparatus. A manually operated switch 93 is connected with lines 94 and 95, both of which go to the motor 4 so that when the switch 93 is closed current is supplied to said motor to effect driving of the blower 3 and the fuel pump 5. One side of the pressure switch 13 is connected by a lead 111 with the line 94 and the other side of said switch is connected by a lead 112 to the primary side of a relay coil 113. The secondary side of the relay coil 113 is connected by a line 114 with the ignition contact B of the safety switch S. The movable contact A on the arm 80 is connected by a line 115 with the line 95. A lead 116 from the line 115 is connected with the secondary side of an ignition transformer 117. A line 117a for high voltage current connects the ignition transformer 117 with the spark plug 15. The bi-metallic electrode 17 may be grounded by a lead 17a. The primary side of the ignition transformer 117 is connected by a line 118 to one side of a coil 119 of the solenoid fuel valve 14. The other side of the solenoid coil 119 is connected by a line 120 with the stationary fuel contact C of the switch S. The line 112 going to one side of the relay coil 113 is connected by a lead 121 to a fixed contact 122 of the relay and the line 115 is connected by a lead 123 to a second fixed contact 124 of said relay coil. A lead 125 connects the line 118 with another relay contact 126 and a lead 127 connects the line 114 with still another contact 128 of said relay. It will be understood that the contact 126 is adapted to engage the contact 122 and that the contact 128 is adapted to engage the contact 124 when the relay 113 is energized. A pilot light 129 is connected by a lead 130 to the line 118 and is connected by a second lead 131 with the line 115. Illumination of the pilot light 129 indicates that the circuit to the electrodes 16 and 17 is completed and that a spark is being formed between said electrodes.

It will be noted that the pressure switch 13 is in series with the ignition switch means provided by the contacts A and B and that both switches must be closed before the relay 113 can be energized. It will also be noted that the contacts A and B are in parallel with the relay contacts 128 and 124, whereby to provide an ignition holding circuit at the time that the contact A is actuated to engage the fuel contact C.

The operation of the circuit is as follows:

When the main switch 93 is closed, the circuit to the motor 4 is completed through the lines 94 and 95 connected with the two terminals of said switch. Upon starting of the motor 4, the blower 3 introduces air into the air intake chamber 2 and the fuel pump 5 starts to build up a pressure in the fuel line 10. When the pressure in the line 10 reaches, say 50–70 pounds, or in any event a pressure sufficient to atomize the fuel at the nozzle 9, the pressure switch 13 will be actuated and electrically complete the circuit from the line 111 to the line 112 going to one terminal of the relay coil 113.

When the burner is started from a cold start, the bimetallic electrode element 17 will be in its expanded condition and the movable arm 80 of the switch S carrying the contact A will be positioned so that said contact engages the ignition contact B. It will be understood, however, that if there is insufficient fuel pressure in the line 10, the fuel pressure switch 13 will not be actuated and the circuit to the relay 113 will not be completed. However, the motor 4 will continue to run so long as the manual switch 93 is closed and tend to build up a pressure in the fuel line 10. Assuming that the necessary pressure is built up in the fuel line 10 and that the fuel pressure switch 13 has been actuated, the circuit to the relay 113 will be completed from line 95 through line 115, contacts A and B of the safety switch S, then from the contact B through line 114 to one side of the relay coil 113 and from the other side of said coil through line 112, the pressure switch 13 and line 111 back to line 94. The completion of this circuit energizes the relay coil 113 and causes the contact 126 to engage the contact 122 and the contact 128 to engage the contact 124. The engagement of contact 126 with the contact 122 will complete the circuit through line 118 to the primary side of the ignition transformer 117, the secondary side of said transformer being connected by lead 116 and line 115 with the line 95. When the relay contact 128 engages the contact 124, current is carried through the lead 127 to the line 114, which is connected to the secondary side of the relay coil 113. This completes a holding circuit to keep current on the relay coil 113 during the period when the movable contact A of the switch S is snapped over into engagement with the fuel contact C, due to actuation of the safety switch S by the rod 28 upon thermal contraction of the bi-metallic electrode 17. Thus, the holding circuit is completed as follows: current travels from the line 95 to line 115 which is connected with the contact 124 through the lead 123. Since the contact 128 is now engaged with the contact 124, the circuit to one terminal of the relay coil will be maintained through the lead 127. The circuit to the other terminal of the relay coil will be completed through line 111, pressure switch 13, and line 112 to maintain said relay energized. Thus, a circuit to the ignition transformer 117 is maintained notwithstanding the fact that the original circuit through the contacts A and B has been broken.

If the ignition transformer 117 creates a spark at the electrodes 16 and 17 of sufficient intensity to ignite the fuel, the bi-metallic electrode 17 will contract and the switch S will automatically snap the contact A into engagement with the fuel contact C and thereby close the circuit to the solenoid coil 119 which opens the solenoid fuel valve 14 controlling the flow of fuel to the burner nozzle 9. Thus, the ignition switch means A—B opens before the fuel switch means A—C closes and these switch means always operate in succession. The circuit to the solenoid coil 119 is completed as follows: current from the line 95 reaches the contact A through the line 115 and is conducted through contacts A and C, and then through the line 120 to the secondary side of the solenoid coil 119. Current to the primary side of the solenoid coil 119 is supplied from the line 94 through line 111, fuel pressure switch 13, line 112, line 121 through contacts 122 and 126, line 125 and then through line 118 to the solenoid coil 119. Whenever the circuit to the ignition transformer 117 is completed the pilot light 129 is illuminated to indicate that the spark is operative. This will be evident from the fact that the pilot light 129 is connected across the lines 118 and 115 by the leads 130 and 131.

If a momentary drop in pressure occurs in the fuel line 10 due to exhaustion of the fuel supply, or to manual or automatic manipulation of the valve 12 such as would cause a pressure drop in the fuel line by by-passing fuel back through the conduit 11 to the intake side of the pump 5, the fuel pressure switch 13 will immediately open and interrupt the circuit to the relay coil 113 causing the relay to be de-energized thereby breaking the circuit to the fuel solenoid valve 14, which closes and cuts off all flow of fuel to the burner nozzle. Simultaneously, the holding circuit to the ignition transformer 117 is interrupted and the spark is discontinued, the pilot light 129 being extinguished. When the fuel supply is replenished or the by-pass valve 12 is properly readjusted, pressure will again build up in the fuel line 10 and actuate the fuel pressure switch 13 so that the apparatus will recycle and complete the circuit to the relay and ignition transformer to effect restarting in the manner described.

The starting cycle of the control means is determined by the length of time that it takes for the bi-metallic electrode 17 to cool and expand to its original cold position. Such expansion will actuate the rod 28 and through the switch pin 72 cause the contact A to be snapped into engagement with the ignition contact B. The time required for cooling the bi-metallic electrode 17 by the blower is about 10–12 seconds, during which period the blower 3 introduces air into the air inlet chamber 2 from whence it travels through the opening 20 into the combustion chamber 1. The introduction of such air effectively purges the combustion chamber 1 of any unburnt gases before any spark reoccurs. However, when the safety switch S is actuated by the bi-metallic electrode 17 to complete the circuit to the ignition transformer 117 there is a 5 or 6 seconds period during which time the arc between the electrodes 16 and 17 heats the bi-metallic electrode 17 to effect contraction of said bi-metallic electrode and permit snap-actuation of the switch S to bring the contact A into engagement with the fuel contact C to supply current to the solenoid valve 14, to effect opening of said valve and the passage of fuel to the burner nozzle 9, as has been previously explained.

This application is a continuation-in-part of copending application Serial No. 412,193 filed September 24, 1941, and entitled Burner control system.

It will be understood that various changes may be made in the apparatus disclosed and in the specific switch means employed herein, without departing from the spirit of the invention or the scope of the annexed claims.

I claim:

1. A burner control system comprising: a burner; a fuel supply line having a solenoid operated valve connected with said burner; a circuit including said solenoid operated valve and having means for igniting said fuel including an ignition transformer and a pair of electrodes for providing a spark adjacent said burner, one of said electrodes being thermally responsive; a pressure-responsive switch connected in said fuel line and in circuit with said ignition transformer and electrodes arranged to complete a circuit to said ignition transformer to effect the initiation of a spark only upon the existence of a predetermined fuel pressure in said fuel line; and means including said thermally responsive electrode for effecting opening of said solenoid operated valve only when said spark is of sufficient intensity to ignite said fuel.

2. A burner control system comprising: a burner nozzle for atomizing fuel; a fuel supply line connected with said burner nozzle; a pump for pumping liquid fuel through said fuel line to said burner nozzle; a circuit having means for igniting the atomized fuel including a pair of electrodes for providing a spark adjacent said burner nozzle, one of said electrodes being thermally responsive; a pressure-responsive switch connected in said fuel line and in circuit with said electrodes arranged to complete a circuit to said electrodes to effect the initiation of a spark only upon the existence of a predetermined fuel pressure in said fuel line; and means including said thermally responsive electrode for effecting flow of fuel through said fuel supply line only when said spark is of sufficient intensity to ignite said fuel.

3. A burner control system comprising: a burner nozzle for atomizing fuel; a fuel supply line connected with said burner nozzle; a pump for pumping liquid fuel through said fuel line to said burner nozzle; a pressure-responsive switch connected in said fuel line between said burner nozzle and pump; a solenoid-operated fuel valve connected in said fuel line between said burner nozzle and said pressure-responsive switch; means for igniting the atomized fuel including a pair of electrodes for providing a spark adjacent said burner nozzle, one of said electrodes including thermally responsive means; fuel switch means for controlling said solenoid-valve operable by said thermally responsive electrode; means including said pressure-responsive switch arranged to effect the initiation of a spark between said electrodes only upon the existence of a predetermined fuel pressure in said fuel line; and means including said thermally responsive electrode arranged to actuate said fuel switch to effect opening of said solenoid fuel valve only upon the creation of a spark between said electrodes of sufficient intensity to ignite said fuel.

4. A fuel burner control system comprising: a burner, a fuel pump; electrically operated valve means for controlling the flow of fuel from said pump to said burner; a pressure-responsive switch between said pump and said electrically operated fuel valve means; means for igniting said fuel, said igniting means including a pair of spaced electrodes, one of said electrodes being bi-metallic and responsive to the heat of the spark produced between said electrodes; means including said pressure-responsive switch arranged to complete a circuit to said electrodes only upon the existence of a predetermined fuel pressure; and a switch in circuit with said flow controlling means actuable to its closed position by said bi-metallic electrode when said bi-metallic electrode is subjected to the heat of a spark of sufficient intensity to ignite said fuel.

5. A fuel burner control system comprising: a burner; a fuel supply line connected with said burner; a pressure-responsive switch connected in said fuel line; means in said fuel line between said burner and pressure-responsive switch for controlling the flow of fuel to said burner; a circuit connected with said pressure responsive switch; means in circuit with said pressure-responsive switch for igniting said fuel, said igniting means comprising a source of high voltage current and a pair of spaced electrodes, one of said electrodes being connected to said source of high voltage current and the other of said electrodes being grounded and being thermally responsive to the heat of the spark produced between said electrodes, said pressure responsive switch being arranged to complete the circuit to said igniting means only upon the existence of a predetermined fuel pressure in said fuel line; and means in said circuit controlled by said thermally responsive electrode operable to cause said fuel flow controlling means to effect a flow of fuel to said burner only when said thermally responsive electrode is actuated by the heat of a spark of sufficient intensity to ignite said fuel.

6. A burner control system comprising: a fuel burner; a fuel supply line connected with said burner; a pressure-responsive switch connected in said fuel line; a circuit including a pair of electrodes adjacent said fuel burner, one of said electrodes being bi-metallic; a relay in said circuit; ignition switch means in said circuit in parallel with said relay and in series with said pressure responsive switch, whereby no spark can occur unless there is sufficient pressure in said fuel line to actuate said pressure-responsive switch; a main switch in said circuit; a holding circuit operatively associated with said first-mentioned circuit for maintaining said relay energized when said main switch and pressure-responsive switch are closed and said ignition control switch means is open; an electrically operated valve in said fuel line between said burner and said pressure-responsive switch for controlling the supply of fuel to said burner; and fuel control switch means in said first-mentioned circuit arranged to be closed upon predetermined thermal actuation of said bi-metallic electrode, whereby said electrically operated valve is opened to permit flow of fuel to said burner only when the spark between said electrodes reaches a predetermined intensity.

7. A burner control system comprising: a burner; a fuel supply line connected with said burner; a circuit including a pressure-responsive switch connected in said fuel line; a solenoid-operated fuel valve in said circuit and connected in said fuel line at a point between said burner and said pressure-responsive switch; a pair of electrodes in said circuit for providing a spark adjacent said burner to ignite said fuel, one of said electrodes being bi-metallic and thermally-responsive to the heat created by the spark; and a single-pole double-throw switch in said circuit operatively associated with said thermally-responsive electrode, said pressure-responsive switch being arranged in said circuit with said single-pole double-throw switch and electrodes to effect the initiation of a spark only upon the existence of a predetermined fuel pressure in said fuel line, and said thermally-responsive electrode in its normally cold condition maintaining said single-pole double-throw switch in position to complete a circuit to said electrodes when said pressure-responsive switch is closed, said thermally-responsive electrode effecting actuation of said single-pole double-throw switch upon heating thereof after the spark has been initiated to cause opening of said solenoid fuel valve only if the spark between said electrodes is of sufficient intensity to ignite said fuel.

8. A burner control system comprising: a burner; a fuel supply line connected with said burner; a circuit including a pressure-responsive switch connected in said fuel line; a solenoid-operated fuel valve in said circuit connected in said fuel line at a point between said burner and said pressure-responsive switch; a pair of electrodes in said circuit for providing a spark adjacent said burner to ignite said fuel, one of said electrodes being bi-metallic and thermally-responsive to the heat created by the spark; ignition switch means and fuel switch means in said circuit operatively associated with said thermally-responsive electrode, said pressure-responsive switch being arranged in series with said ignition switch means to effect the initiation of a spark only upon the existence of a predetermined fuel pressure in said fuel line, and said thermally responsive electrode in its normally cold condition maintaining said ignition switch means closed to complete a circuit to said electrodes when said pressure-responsive switch is closed, said thermally-responsive electrode effecting closing of said fuel switch means upon heating thereof after the spark has been initiated to complete a circuit including said solenoid valve to cause opening of said solenoid fuel valve only upon the creation of a spark between said electrodes of sufficient intensity to ignite said fuel.

9. A burner control system comprising: a burner; a fuel supply line connected with said burner; a circuit including a pressure-responsive switch connected in said fuel line; a solenoid-operated fuel valve in said circuit connected in said fuel line at a point between said burner and said pressure-responsive switch; a pair of electrodes in said circuit for providing a spark adjacent said burner to ignite said fuel, one of said electrodes being bi-metallic and thermally-responsive to the heat created by the spark; and a switch in said circuit including a stationary ignition contact, a stationary fuel contact and a movable contact between said two stationary contacts actuable by said thermally-responsive electrode to engage one or the other of said stationary contacts, said pressure-responsive switch being arranged in said circuit with said ignition contact, movable contact and electrodes to effect the initiation of a spark only upon the existence of a predetermined fuel pressure in said fuel line, and said thermally-responsive electrode in its normally cold condition positioning said movable contact in engagement with said ignition contact to complete a circuit to said electrodes when said pressure-responsive switch is closed, said thermally-responsive electrode effecting engagement of said movable contact with said fuel contact upon heating thereof after said spark has been initiated to cause opening of said solenoid fuel valve only upon the creation of a spark between said electrodes of sufficient intensity to ignite said fuel.

10. A fuel burner control system comprising: a burner; a fuel supply line connected with said burner; a circuit including an electromagnetic valve in said fuel line for controlling the flow of fuel to said burner; a pressure-responsive switch in said circuit and connected in said fuel line on the inlet side of said electromagnetic valve; means in said circuit for igniting said fuel, said igniting means comprising a source of high voltage current and a pair of spaced electrodes, one of said electrodes being bi-metallic and responsive to the heat of the spark produced between said electrodes, said pressure-responsive switch being arranged to complete a circuit to said electrodes only upon the existence of a predetermined pressure in said fuel line; switch means in said circuit controlled by said heat-responsive electrode operable to effect opening of said electromagnetic valve to permit a flow of fuel to said burner when said heat-responsive electrode is subjected to the heat of a spark of sufficient intensity to ignite said fuel; and signal means in said circuit operable upon closing of said pressure-responsive switch to indicate that a spark is being formed between said electrodes.

11. A fuel burner control system comprising: a burner; a circuit including a main switch; a motor connected in said circuit; a fuel pump, said motor being arranged to drive said pump immediately upon closing of said main switch; a fuel line connecting said pump and burner; a pressure-responsive switch in said circuit and connected in said fuel line; electrically operated valve means between said burner and said pressure-responsive switch for controlling the supply of fuel to said burner; means in said circuit for igniting said fuel including a pair of spaced electrodes, one of said electrodes being bi-metallic and being responsive to the heat of the spark produced between said electrodes, said pressure-responsive switch being arranged to complete the circuit to said igniting means only upon the existence of a predetermined fuel pressure in said fuel line; and fuel control switch means in circuit with said electrically operated valve means adapted to be closed to effect opening of said valve means upon thermal actuation of said bi-metallic electrode when said bi-metallic electrode is subjected to the heat of a spark of sufficient intensity to ignite said fuel.

12. A burner control system comprising: a burner; a fuel supply line connected with said burner; circuit means including a pressure-responsive switch connected in said fuel line; electrically operated valve means in said fuel line between said burner and said pressure-responsive switch and connected in said circuit means for controlling the flow of fuel to said burner; fuel ignition means connected in said circuit means including a pair of electrodes positioned adjacent said burner, one of said electrodes comprising a bimetallic strip; a rod operatively engaged with said bi-metallic strip and arranged for longitudinal movement upon expansion of said bi-metallic strip; and a sensitive, snap-action switch connected in said circuit means including a pair of stationary contacts and a movable contact arranged to be actuated by said rod to successively engage said stationary contacts, said movable contact being engaged with one of said stationary contacts to complete a circuit to said ignition means when said bi-metallic electrode is cold and sufficient pressure exists in said fuel line to actuate said pressure-responsive switch, and to engage said movable contact with the other of said stationary contacts to complete a circuit to said electrically operated valve means to cause a flow of fuel when said bi-metallic electrode is heated by a spark of sufficient intensity to ignite said fuel.

13. A burner control system comprising: a burner; means for supplying fuel to said burner; fuel ignition means including a pair of electrodes positioned adjacent said burner nozzle, one of said electrodes comprising a bi-metallic strip; a rod having one end thereof operatively engaged with said bi-metallic strip and arranged for longitudinal movement upon thermal actuation of said bi-metallic strip; switch means including a switch housing and comprising a combined ignition switch and a fuel control switch arranged to be actuated by said rod; means supporting said switch housing for pivotal adjustment relative to the other end of said rod; and means for adjusting said switch housing relative to said other end of said rod.

14. Fuel burning apparatus comprising: a furnace having an air intake chamber and a combustion chamber above said air intake chamber; a blower for introducing air into said chambers; a burner operatively mounted in said air intake chamber; a fuel pump; a circuit including a motor for driving said blower and fuel pump; a fuel supply line connecting said fuel pump with said burner; a fuel pressure-responsive switch connected in said fuel line; a main switch connected in said circuit with said motor so that the motor drives said blower and fuel pump immediately upon closing of said main switch and said pump starts to build up a pressure in said fuel line; an electrically controlled fuel valve connected in said fuel line at a point between said burner and said pressure-responsive switch; a pair of electrodes for producing a spark adjacent said burner; an ignition circuit including said electrodes, a relay, an ignition transformer, and ignition switch means connected in series with said fuel pressure-responsive switch, said ignition switch means also being connected in parallel with one pair of contacts of said relay, whereby the ignition circuit is completed only if there is sufficient pressure in said fuel line to actuate said fuel pressure-responsive switch; means including fuel control switch means for controlling the operation of said electrically operated fuel valve, said main switch also controlling the supply of current to said relay, ignition transformer and electrically operated fuel valve, said ignition switch means being closed when said burner is in cold condition and said fuel control switch means being open when said burner is in cold condition, said fuel control switch means being arranged to be actuated in response to the formation of a spark of predetermined intensity between said electrodes, whereby to actuate said electrically controlled fuel valve to supply fuel to said burner.

15. A burner control system, comprising: a main burner; a fuel supply line connected with said burner; means in said fuel line controlling the flow of fuel to said burner; a pair of electrodes adjacent said burner for spark-igniting said fuel; pressure-responsive means connected with said fuel line and operatively associated with said electrodes for maintaining said electrodes inactive so long as the pressure in said fuel line is below a predetermined value; and means responsive to the sparking at said electrodes controlling said fuel flow control means for preventing all flow of fuel to said burner when the spark is not in a condition to ignite said fuel.

16. A burner control system, comprising: a main burner; a fuel supply line connected with said burner; a pair of electrodes adjacent said burner for spark-igniting said fuel; means, including pressure-responsive means connected with said fuel line controlling the energization of said electrodes, said pressure-responsive means maintaining said electrodes inactive so long as the pressure in said fuel line is below a predetermined value; a fuel valve connected in said fuel line at a point between said burner and pressure-responsive means for controlling the flow of fuel through said fuel supply line to said burner; and means responsive to the sparking at said electrodes arranged to effect opening of said fuel valve only when the spark at said electrodes is in a condition capable of igniting said fuel.

17. A burner control system, comprising: a main burner; a fuel supply line connected with said burner; an electrically operated fuel valve in said fuel supply line controlling the flow of fuel to said burner; a circuit including said electrically operated fuel valve and a pair of electrodes for spark-igniting said fuel; a pressure-responsive switch connected in said fuel line and in circuit with said electrodes arranged to complete a circuit to said electrodes only upon the existence of a predetermined fuel pressure in said fuel line; and means responsive to the sparking at said electrodes for effecting energization and opening of said electrically operated fuel valve only when the spark at said electrodes is in a condition capable of igniting said fuel.

PERRY ARANT.

REFERENCES CITED

The following references are of record in the file of this patent:

UNITED STATES PATENTS

| Number | Name | Date |
| --- | --- | --- |
| 2,140,708 | McCabe | Dec. 20, 1938 |
| 2,196,443 | Maynard | Apr. 9, 1940 |
| 1,904,549 | Scognamillo | Apr. 18, 1933 |
| 1,820,612 | Good et al. | Aug. 25, 1931 |
| 2,142,530 | Stahl | Jan. 3, 1939 |
| 1,394,807 | Blanchard | Oct. 25, 1921 |
| 1,539,249 | Fesler | May 26, 1925 |
| 2,301,446 | Ott | Nov. 10, 1942 |
| 1,982,561 | Williams | Nov. 27, 1934 |
| 2,323,767 | Hammond | July 6, 1943 |
| 2,335,471 | Ashcraft | Nov. 30, 1943 |